US010205185B2

United States Patent
Koiwa et al.

(10) Patent No.: US 10,205,185 B2
(45) Date of Patent: Feb. 12, 2019

(54) METHOD FOR CONTROLLING FUEL CELL SYSTEM

(71) Applicant: HONDA MOTOR CO., LTD., Tokyo (JP)

(72) Inventors: Nobuki Koiwa, Wako (JP); Osamu Ogami, Wako (JP); Shinya Watanabe, Wako (JP); Takashi Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 15/444,333

(22) Filed: Feb. 28, 2017

(65) Prior Publication Data

US 2017/0250423 A1    Aug. 31, 2017

(30) Foreign Application Priority Data

Feb. 29, 2016  (JP) ................................. 2016-036698

(51) Int. Cl.
*H01M 8/04746* (2016.01)
*H01M 8/04119* (2016.01)
*H01M 8/04537* (2016.01)
*H01M 8/04992* (2016.01)
(Continued)

(52) U.S. Cl.
CPC ... *H01M 8/04753* (2013.01); *H01M 8/04141* (2013.01); *H01M 8/04641* (2013.01); *H01M 8/04951* (2016.02); *H01M 8/04992* (2013.01); *H01M 2008/1095* (2013.01); *H01M 2250/20* (2013.01); *Y02T 90/32* (2013.01)

(58) Field of Classification Search
CPC ......... H01M 8/04753; H01M 8/04141; H01M 8/04641

USPC ......................................................... 429/430
See application file for complete search history.

(56) References Cited

U.S. PATENT DOCUMENTS 8,043,753 B2 * 10/2011 Mohri ............... H01M 8/04126
                                                         429/413
9,093,679 B2 *  7/2015 Morita .............. H01M 8/04388
9,640,818 B2 *  5/2017 Furuyama .......... H01M 8/0488
(Continued)

FOREIGN PATENT DOCUMENTS

JP     07-235324     9/1995
JP     2005-190843   7/2005
(Continued)

OTHER PUBLICATIONS

Japanese Office Action for corresponding JP Application No. 2016-036698, dated Aug. 29, 2017.

*Primary Examiner* — Abdullah Riyami
*Assistant Examiner* — Nader Alhawamdeh
(74) *Attorney, Agent, or Firm* — Mori & Ward, LLP

(57) ABSTRACT

A method for controlling a fuel cell system includes supplying an oxidant gas, via an oxidant gas supply channel, to a cathode electrode of a fuel cell. The oxidant gas is moistened to be supplied to the cathode electrode with a humidifier. An opening degree of a bypass channel valve is decreased via a feedforward control to a first opening degree when an impedance has reached a lower limit value. The opening degree of the bypass channel valve is increased via the feedforward control to a second opening degree when the impedance has reached an upper limit value. The first opening degree is smaller than the second opening degree.

19 Claims, 4 Drawing Sheets

(51) Int. Cl.
*H01M 8/04858* (2016.01)
*H01M 8/1018* (2016.01)

(56) References Cited

U.S. PATENT DOCUMENTS

2012/0077102 A1* 3/2012 Morita .............. H01M 8/04388
 429/429
2013/0095402 A1* 4/2013 Furuyama ........... H01M 8/0488
 429/427

FOREIGN PATENT DOCUMENTS

| | | |
|---|---|---|
| JP | 2007-018741 | 1/2007 |
| JP | 2007-303559 | 11/2007 |
| JP | 2014-060068 | 4/2014 |
| JP | 2015-043313 | 3/2015 |

* cited by examiner

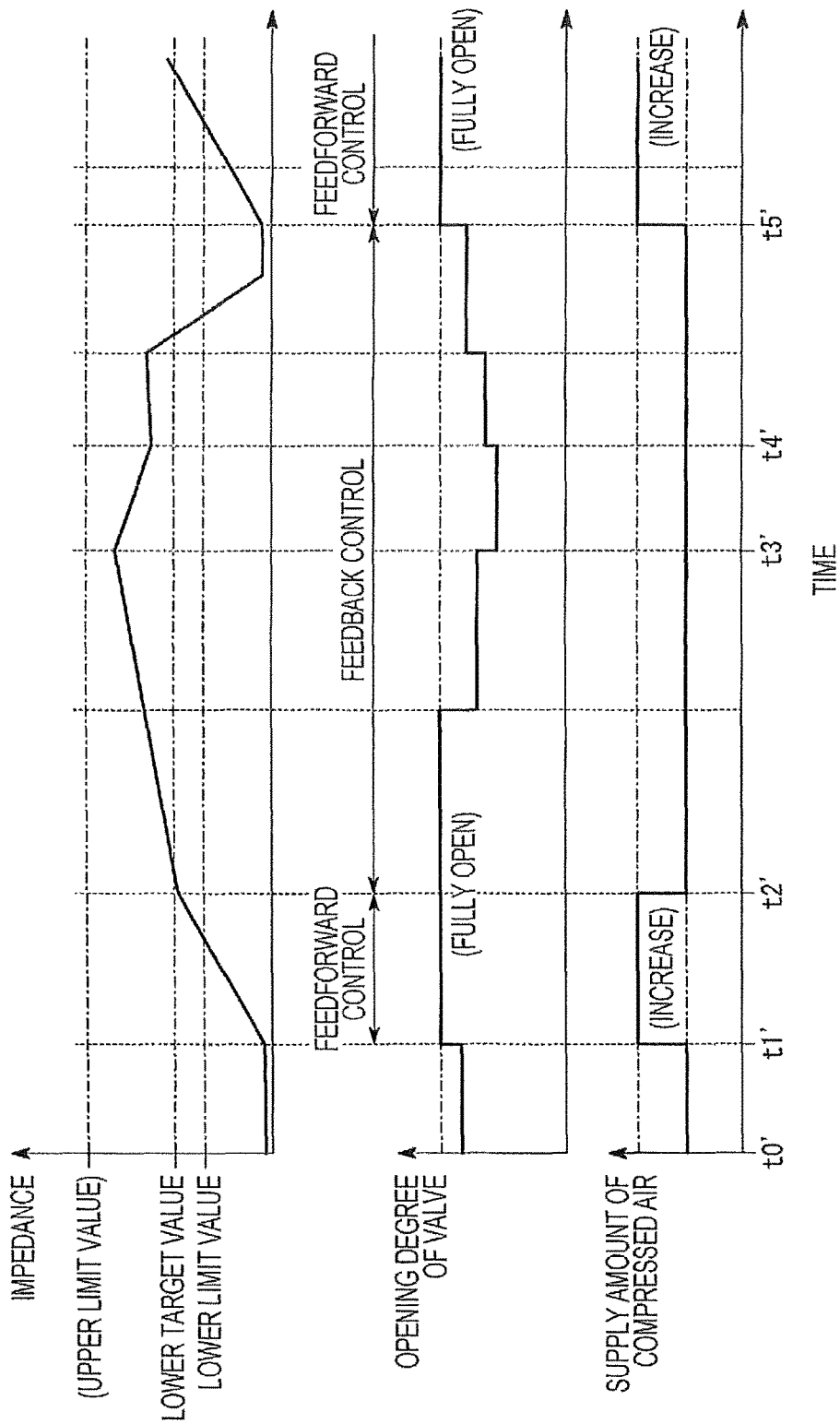

METHOD FOR CONTROLLING FUEL CELL SYSTEM

CROSS-REFERENCE TO RELATED APPLICATIONS

The present application claims priority under 35 U.S.C. § 119 to Japanese Patent Application No. 2016-036698, filed Feb. 29, 2016, entitled "Method for Controlling Fuel Cell System." The contents of this application are incorporated herein by reference in their entirety.

BACKGROUND

1. Field

The present disclosure relates to a method for controlling a fuel cell system.

2. Description of the Related Art

A solid polymer electrolyte fuel cell includes a membrane electrode assembly (MEA), in which an anode electrode is disposed on one surface of an electrolyte membrane, which is a proton-conductive polymer ion-exchange membrane, and a cathode electrode is disposed on the other surface of the electrolyte membrane. The membrane electrode assembly and separators, sandwiching the membrane electrode assembly, constitute a power generation cell (unit cell). Typically, a predetermined number of power generation cells are stacked and, for example, mounted in a fuel cell vehicle (a fuel cell electric automobile or the like) as a vehicle fuel cell stack.

The fuel cell generates electric power by causing an electrochemical reaction between a fuel gas (such as hydrogen gas) supplied to the anode electrode and an oxidant gas (such as compressed air) supplied to the cathode electrode. During power generation, protons are generated at the anode electrode, and the protons are conducted through the electrolyte membrane and move to the cathode electrode. At the cathode electrode, protons, electrons, and oxygen in the oxidant gas react to generate water.

The electrolyte membrane needs to be moist so that the electrolyte membrane can conduct protons. For this purpose, a humidifier is disposed in an oxidant gas supply channel as described, for example, in Japanese Unexamined Patent Application Publication No. 2005-190843. The oxidant gas is moistened while passing through the humidifier, and the moist oxidant gas and the generated water keep the electrolyte membrane moist. A bypass channel, which bypasses the humidifier, branches off from the oxidant gas supply channel.

However, for example, when the output electric current of the fuel cell is small, the electrochemical reaction is not accelerated, and therefore the amount of generated water is small. Accordingly, the electrolyte membrane becomes drier. In this state, the impedance of the fuel cell increases. Conversely, the impedance decreases when a sufficient amount of moisture is added to the electrolyte membrane.

Therefore, some fuel cell systems have a mechanism for determining whether the electrolyte membrane is becoming dry or becoming moist from a measured impedance value. For example, Japanese Unexamined Patent Application Publication No. 7-235324 describes that whether or not the cathode electrode is excessively moist is determined on the basis of the impedance of the fuel cell and that the oxidant gas is supplied through the bypass channel when it is determined that the cathode electrode is excessively moist.

SUMMARY

According to one aspect of the present invention, a method for controlling a fuel cell system includes a fuel cell that includes a membrane electrode assembly in which a solid polymer electrolyte membrane is sandwiched between an anode electrode and a cathode electrode and that generates electric power by causing an electrochemical reaction between a fuel gas that is supplied through a fuel gas supply channel to the anode electrode and an oxidant gas that is supplied through an oxidant gas supply channel to the cathode electrode, an oxidant gas supply mechanism that includes a rotational driving unit and that supplies the oxidant gas to the oxidant gas supply channel as the rotational driving unit rotates, a humidifier that moistens the oxidant gas supplied from the oxidant gas supply mechanism, a bypass channel that branches off from the oxidant gas supply channel and that bypasses the humidifier, a bypass channel valve that is disposed in the bypass channel and that closes or opens the bypass channel, and an impedance measuring unit that measures an impedance of the fuel cell. The method includes operating the bypass channel valve by performing feedforward control so as to close the bypass channel to a predetermined opening degree when the impedance measured by the impedance measuring unit has reached a predetermined lower limit value, and operating the bypass channel valve by performing feedforward control so as to open the bypass channel to a predetermined opening degree when the impedance measured by the impedance measuring unit has reached a predetermined upper limit value, so that the impedance is between the lower limit value and the upper limit value.

According to another aspect of the present invention, a method for controlling a fuel cell system includes supplying an oxidant gas, via an oxidant gas supply channel, to a cathode electrode of a fuel cell. The fuel cell includes a membrane electrode assembly including a solid polymer electrolyte membrane which is sandwiched between an anode electrode and the cathode electrode. A fuel gas is supplied to the anode electrode of the fuel cell to generate electric power via an electrochemical reaction between the fuel gas and the oxidant gas. The oxidant gas is moistened to be supplied to the cathode electrode with a humidifier provided in the oxidant gas supply channel. A bypass channel valve is provided in a bypass channel that bypasses the humidifier. An impedance of the fuel cell is measured. An opening degree of the bypass channel valve is decreased via a feedforward control to a first opening degree when the impedance has reached a lower limit value. The opening degree of the bypass channel valve is increased via the feedforward control to a second opening degree when the impedance has reached an upper limit value. The first opening degree is smaller than the second opening degree.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is a timing chart showing how the opening degree of the BP-opening-degree adjusting valve (bypass channel valve) and the supply amount of compressed air are changed in accordance with change in impedance when the solid polymer electrolyte membrane is likely to become excessively moist.

DESCRIPTION OF THE EMBODIMENTS

Figure 1:
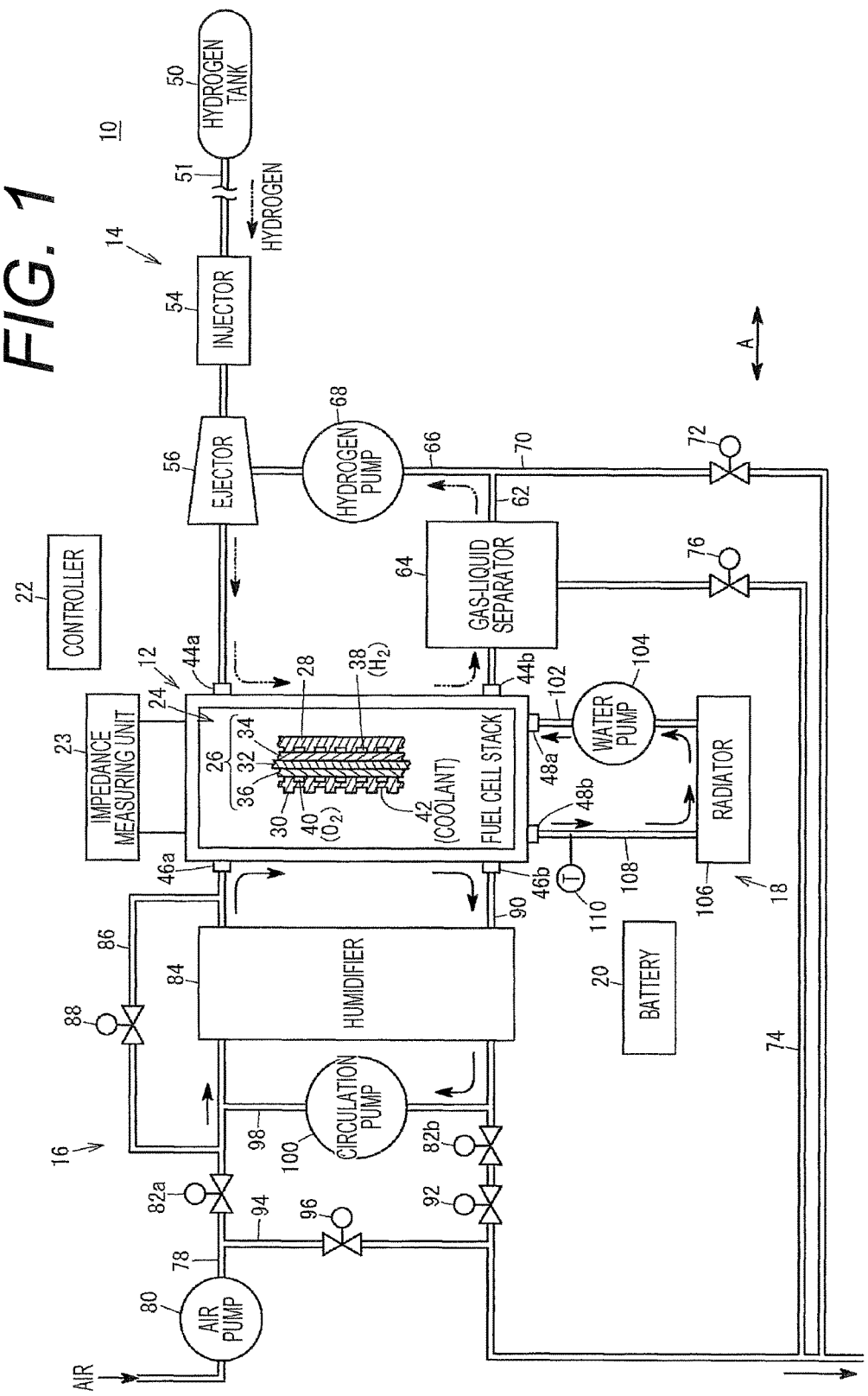
FIG. 1 is a schematic diagram of a fuel cell system to which a method according to an embodiment of the present disclosure is applied.

The embodiments will now be described with reference to the accompanying drawings, wherein like reference numerals designate corresponding or identical elements throughout the various drawings.

Hereinafter, an embodiment of a method for controlling a fuel cell system according to the present disclosure will be described in detail with reference to the drawings. In the present embodiment, an example in which the fuel cell system is mounted in a fuel cell vehicle, such as a fuel cell electric automobile, is described.

First, a fuel cell system 10 will be described with reference to FIG. 1, which is a schematic diagram. The fuel cell system 10 includes a fuel cell stack 12 (fuel cell).

The fuel cell stack 12 includes a fuel gas supply device 14 that supplies a fuel gas, an oxidant gas supply device 16 that supplies an oxidant gas, and a coolant supply device 18 that supplies a coolant. In the present embodiment, hydrogen gas is used as the fuel gas, and compressed air is used as the oxidant gas. The fuel cell system 10 further includes a battery 20 (storage battery) that is an energy storage device, a controller 22 that is a system control device, and an impedance measuring unit 23.

In the present embodiment, a predetermined lower limit value and a predetermined upper limit value of impedance are set beforehand and stored in the controller 22. The controller 22 determines whether or not impedance acquired from the impedance measuring unit 23 has reached the lower limit value or the upper limit value. A lower target value and an upper target value, which are thresholds for finishing feedforward control (described below), are also stored in the controller 22. The lower target value and upper target value are values between the lower limit value and the upper limit value.

In FIG. 1, for ease of understanding, the controller 22 and the impedance measuring unit 23 are independently illustrated. In reality, however, the impedance measuring unit 23 is a part of the controller 22. As described below, the impedance measuring unit 23 determines whether a solid polymer electrolyte membrane 32 is likely to become dry or likely to become moist on the basis of the impedance value of the fuel cell stack 12 (power generation cells 24).

The fuel cell stack 12 includes a plurality of power generation cells 24 that are stacked in the direction of arrow A (a horizontal direction or a vertical direction) in FIG. 1. In each of the power generation cells 24, a membrane electrode assembly 26 is sandwiched between a first separator 28 and a second separator 30. The first separator 28 and the second separator 30 are made of metal or carbon.

The membrane electrode assembly 26 includes, for example, the solid polymer electrolyte membrane 32, which is a thin water-soaked perfluorosulfonic acid membrane, and an anode electrode 34 and a cathode electrode 36 that sandwich the solid polymer electrolyte membrane 32. Instead of a fluoropolymer electrolyte, a hydrocarbon (HC) electrolyte may be used as the solid polymer electrolyte membrane 32.

A hydrogen gas channel 38 (fuel gas channel), for supplying hydrogen gas to the anode electrode 34, is formed on a surface of the first separator 28 facing the membrane electrode assembly 26. An air channel 40, for supplying air to the cathode electrode 36, is formed on a surface of the second separator 30 facing the membrane electrode assembly 26. A coolant channel 42, through which a coolant flows, is formed between the first separator 28 and the second separator 30 that are adjacent to each other.

The fuel cell stack 12 has a hydrogen gas inlet 44a, a hydrogen gas outlet 44b, an air inlet 46a, an air outlet 46b, a coolant inlet 48a, and a coolant outlet 48b. The hydrogen gas inlet 44a extends through the power generation cells 24 in the stacking direction and is connected to the supply side of the hydrogen gas channel 38. Likewise, the hydrogen gas outlet 44b extends through the power generation cells 24 in the stacking direction and is connected to the discharge side of the hydrogen gas channel 38. The hydrogen gas channel 38, the hydrogen gas inlet 44a, and the hydrogen gas outlet 44b constitute an anode channel.

Likewise, the air inlet 46a extends through the power generation cells 24 in the stacking direction and is connected to the supply side of the air channel 40. The air outlet 46b extends through the power generation cells 24 in the stacking direction and is connected to the discharge side of the air channel 40. The air channel 40, the air inlet 46a, and the air outlet 46b constitute a cathode channel.

The coolant inlet 48a extends through the power generation cells 24 in the stacking direction and is connected to the supply side of the coolant channel 42. The coolant outlet 48b extends through the power generation cells 24 in the stacking direction and is connected to the discharge side of the coolant channel 42.

The fuel gas supply device 14 includes a hydrogen tank 50 that stores high-pressure hydrogen gas. The hydrogen tank 50 is connected to the hydrogen gas inlet 44a of the fuel cell stack 12 through a hydrogen gas supply passage 51 (fuel gas supply channel). The hydrogen gas is supplied to the fuel cell stack 12 through the hydrogen gas supply passage 51.

An injector 54 and an ejector 56 are arranged in series in the hydrogen gas supply passage 51. When the pressure in the ejector 56 becomes a negative pressure, the hydrogen gas is sucked from a hydrogen circulation channel 66.

A hydrogen gas discharge passage 62 (anode off-gas pipe) is connected to the hydrogen gas outlet 44b of the fuel cell stack 12. Exhaust hydrogen gas (anode off-gas), which is hydrogen gas that has at least partially been used in the anode electrode 34, is discharged from the fuel cell stack 12 through the hydrogen gas discharge passage 62.

A gas-liquid separator 64 is disposed in the hydrogen gas discharge passage 62. The hydrogen circulation channel 66 branches off from a position downstream of the gas-liquid separator 64, and a downstream portion of the hydrogen circulation channel 66 is connected to the ejector 56. A hydrogen pump 68 is disposed in the hydrogen circulation channel 66. In particular, when activated, the hydrogen pump 68 causes the anode off-gas, which has been discharged to the hydrogen gas discharge passage 62, to circulate to the hydrogen gas supply passage 51 through the hydrogen circulation channel 66 and the ejector 56.

One end of a purge channel 70 is connected to the hydrogen gas discharge passage 62, and a purge valve 72 is disposed in the purge channel 70. One end of a drain channel 74, for draining a fluid mainly including a liquid component, is connected to a bottom portion of the gas-liquid separator 64. A drain valve 76 is disposed in the drain channel 74.

The oxidant gas supply device 16 includes an air pump 80, which is disposed in an air supply passage 78 (oxidant gas supply channel) and which corresponds to an oxidant gas supply mechanism. The air pump 80 is a compressor that includes a motor, which corresponds to a rotational driving unit, and that compresses and supplies air. That is, the air pump 80 compresses air as the motor rotates and supplies the compressed air to the fuel cell stack 12 through the air supply passage 78.

Detailed description of the air pump 80 will be omitted, because an air pump having the aforementioned structure is known.

The air supply passage 78 is connected to the air inlet 46a of the fuel cell stack 12 at a position downstream of the air pump 80, and a supply on-off valve 82a (inlet shut-off valve) and a humidifier 84 are disposed between the air pump 80 and the air inlet 46a. A bypass supply passage 86 (bypass channel), which bypasses the humidifier 84, branches off from the air supply passage 78. The bypass supply passage 86 joins the air supply passage 78 at a position downstream of the humidifier 84.

A BP-opening-degree adjusting valve 88, which corresponds to a bypass channel valve, is disposed in the bypass supply passage 86. The BP-opening-degree adjusting valve 88 is electrically connected to the controller 22. When receiving a control instruction from the controller 22, the BP-opening-degree adjusting valve 88 operates until the opening degree of the BP-opening-degree adjusting valve 88 becomes a predetermined opening degree. Thus, the opening degree of the BP-opening-degree adjusting valve 88 is adjusted by the controller 22.

An air discharge passage 90 (cathode off-gas discharge passage) is connected to the air outlet 46b of the fuel cell stack 12. Exhaust compressed air (cathode off-gas), which is compressed air that has at least partially been used in the cathode electrode 36, is discharged from the fuel cell stack 12 through the air discharge passage 90.

The humidifier 84 is disposed downstream of the air discharge passage 90. Therefore, the humidifier 84 exchanges water and heat between the compressed air supplied from the air pump 80 and the cathode off-gas. A discharge on-off valve 82b (outlet shut-off valve) and a back-pressure valve 92 are disposed in the air discharge passage 90 at positions downstream of the humidifier 84. The other end of the purge channel 70 and the other end of the drain channel 74 are connected and joined to a downstream portion of the air discharge passage 90, thereby forming a diluting portion.

The back-pressure valve 92 is pressure adjusting valve that is used to control the pressure of compressed air supplied to the cathode channel. That is, the internal pressure of the cathode electrode 36 is adjusted by the back-pressure valve 92.

Two ends of a bypass channel 94 are respectively connected to the air supply passage 78 and the air discharge passage 90 at a position upstream of the supply on-off valve 82a and at a position downstream of the discharge on-off valve 82b and downstream of the back-pressure valve 92. A BP-flow-rate adjusting valve 96, which is used to adjust the flow rate of air that flows through the bypass channel 94, is disposed in the bypass channel 94.

An air circulation channel 98 is connected to the air supply passage 78 and the air discharge passage 90 respectively at a position downstream of the supply on-off valve 82a and at a position upstream of the discharge on-off valve 82b. A circulation pump 100 is disposed in the air circulation channel 98. The circulation pump 100 causes discharge air, which has been discharged to the air discharge passage 90, to circulate to the air supply passage 78 through the air circulation channel 98.

The coolant supply device 18 includes a coolant supply passage 102 that is connected to the coolant inlet 48a of the fuel cell stack 12, and a water pump 104 is disposed in the coolant supply passage 102. The coolant supply passage 102 is connected to a radiator 106; and a coolant discharge passage 108, which is connected to the coolant outlet 48b, is connected to the radiator 106. A temperature sensor 110 for detecting a coolant outlet temperature is disposed in the coolant discharge passage 108.

Next, using flowcharts of FIG. 2, a method for controlling the fuel cell system 10 according to the present embodiment will be described in relation to the operation of the fuel cell system 10.

When starting a fuel cell vehicle including the fuel cell system 10, the ignition is turned on and the fuel cell stack 12 is activated. At this time, the controller 22 sends an instruction signal for opening the injector 54 to supply hydrogen gas from the fuel gas supply device 14 to the anode channel (step S1 in FIG. 2). Thus, a predetermined amount of hydrogen gas is supplied from the hydrogen tank 50 to the hydrogen gas supply passage 51, the hydrogen gas flows through the injector 54 and the ejector 56 of the hydrogen gas supply passage 51, and the hydrogen gas is supplied to the hydrogen gas inlet 44a of the fuel cell stack 12.

The hydrogen gas flows from the hydrogen gas inlet 44a into the hydrogen gas channel 38 and moves along the hydrogen gas channel 38. Thus, the hydrogen gas is supplied to the anode electrode 34 of the membrane electrode assembly 26.

Figure 2:
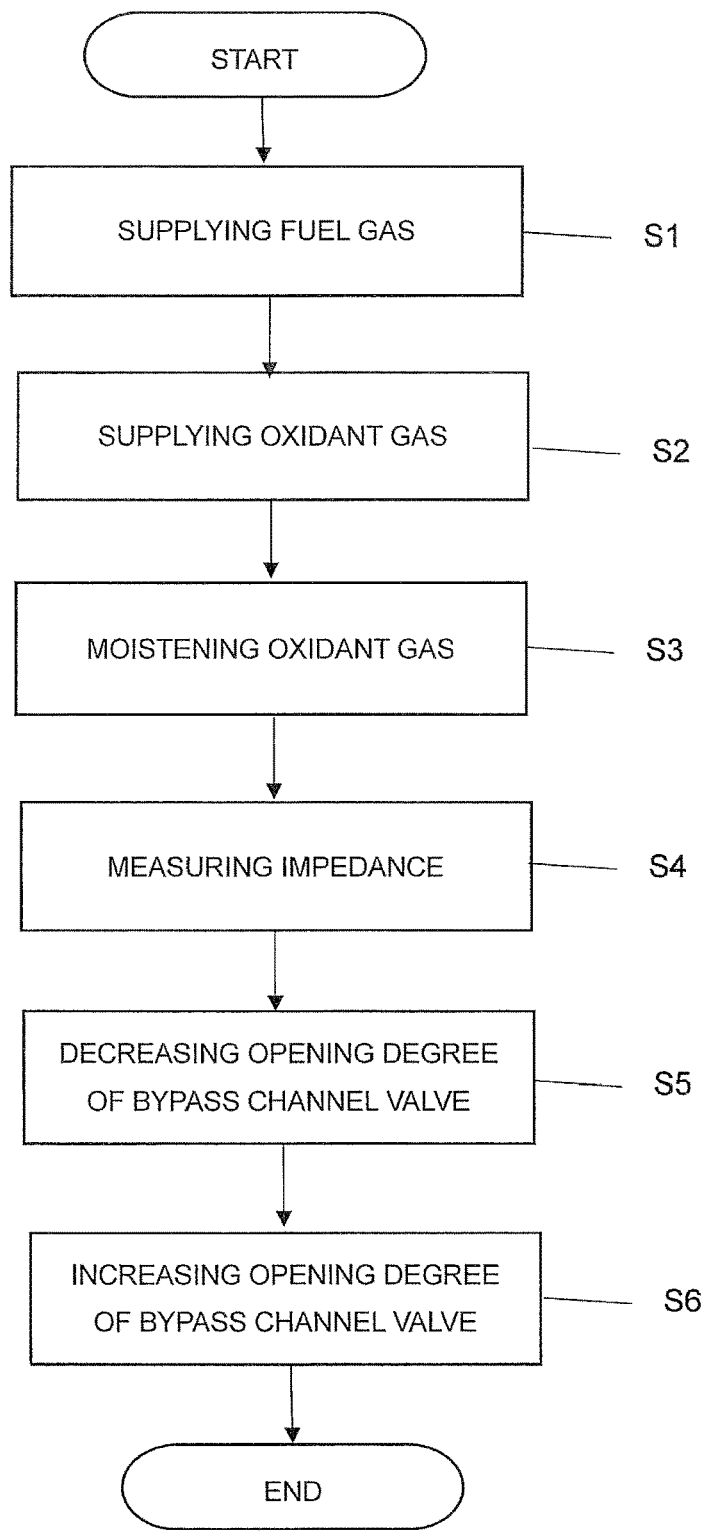
FIG. 2 is flowchart to explain the method according to the embodiment of the present disclosure.

Moreover, the controller 22 sends an instruction signal for activating the air pump 80 to supply compressed air from the oxidant gas supply device 16 (step S2 in FIG. 2). Accordingly, the air pump 80 rotates to compress air and to feed the compressed air to the air supply passage 78. The compressed air is moistened while passing through the humidifier 84 and then supplied to the air inlet 46a of the fuel cell stack 12 (step S3 in FIG. 2). The compressed air flows from the air inlet 46a into the air channel 40 and then moves along the air channel 40, and thereby the compressed air is supplied to the cathode electrode 36 of the membrane electrode assembly 26.

Accordingly, in the membrane electrode assembly 26, the hydrogen gas supplied to the anode electrode 34 and oxygen in the compressed air supplied to the cathode electrode 36 cause an electrochemical reaction in the electrode catalyst layers and electric power is generated. A part of moisture added to the compressed air by the humidifier 84 permeates from the cathode electrode 36 into the solid polymer electrolyte membrane 32 and reaches the anode electrode 34.

Figure 3:
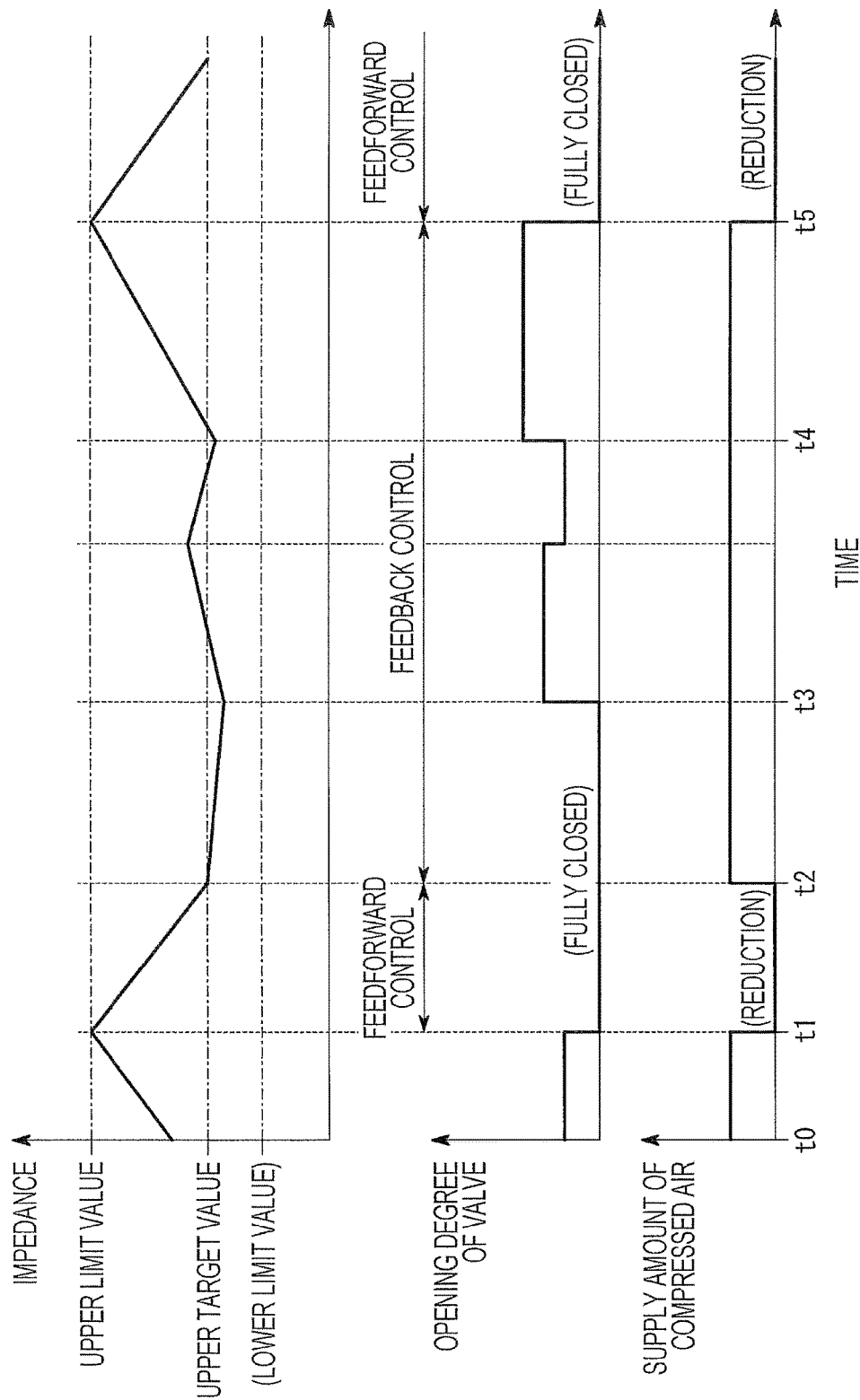
FIG. 3 is a timing chart showing how the opening degree of a BP-opening-degree adjusting valve (bypass channel valve) and the supply amount of compressed air are changed in accordance with change in impedance when a solid polymer electrolyte membrane is likely to become dry.

At this time, the BP-opening-degree adjusting valve 88 is opened or closed as necessary. FIG. 3 shows a case where the BP-opening-degree adjusting valve 88 is opened to a predetermined opening degree. In this case, a part of compressed air supplied from the air pump 80 is distributed to the bypass supply passage 86. Because the bypass supply passage 86 bypasses the humidifier 84, the compressed air that flows through the bypass supply passage 86 is not moistened. That is, at this time, mixed air, which includes moistened compressed air and dry (non-moistened) compressed air, is supplied to the cathode electrode 36.

The flow rate of dry compressed air is adjusted by adjusting the opening degree of the BP-opening-degree adjusting valve 88. Thus, the humidity of mixed air is adjusted. Accordingly, compressed air having an appropriately adjusted humidity is supplied to the cathode electrode 36.

In the coolant supply device 18, the water pump 104 operates to supply a coolant, such as pure water, ethylene glycol, oil, or the like from the coolant supply passage 102 to the coolant inlet 48a of the fuel cell stack 12. The coolant flows along the coolant channel 42, cools the power generation cells 24, and then is discharged from the coolant outlet 48b to the coolant discharge passage 108.

The hydrogen gas supplied to the anode electrode 34 and partially consumed is discharged from the hydrogen gas outlet 44b to the hydrogen gas discharge passage 62 as anode off-gas. At this time, the anode off-gas carries moisture (water) that has reached the anode electrode 34 as described above. That is, the anode off-gas that flows into the gas-liquid separator 64 is a moist gas including water.

The gas-liquid separator 64 separates most of water in the anode off-gas. The liquid (water) is discharged from the drain channel 74 when the drain valve 76 is opened. The anode off-gas, from which water has been separated but in which a small amount of mist remains, flows from the hydrogen gas discharge passage 62 into the hydrogen circulation channel 66 as the hydrogen pump 68 operates. Then, the anode off-gas is sucked into the ejector 56 from the hydrogen circulation channel 66, joins a flow of new hydrogen gas that has passed through the injector 54, and is supplied to the anode channel from the hydrogen gas supply passage 51. Thus, the anode off-gas is circulated and supplied to the fuel cell stack 12.

The anode off-gas that has been discharged to the hydrogen gas discharge passage 62 is discharged (purged), as necessary, to the outside as the purge valve 72 is opened.

Likewise, compressed air that has been supplied to the cathode electrode 36 and partially consumed is discharged from the air outlet 46b to the air discharge passage 90 as cathode off-gas. The cathode off-gas flows through the humidifier 84 to humidify new compressed air supplied from the air supply passage 78, the pressure of the cathode off-gas is adjusted to a set pressure of the back-pressure valve 92, and the cathode off-gas is discharged to the diluting portion. The cathode off-gas, which has been discharged to the air discharge passage 90, is supplied from the air circulation channel 98 to the air supply passage 78 as the circulation pump 100 operates. In this case, the cathode off-gas is also circulated and supplied to the fuel cell stack 12.

While the fuel cell stack 12 is being operated as described above, the impedance measuring unit 23 measures the impedance of the fuel cell stack 12, to be more specific, the impedance of the power generation cells 24 (step S4 in FIG. 2). The controller 22 constantly acquires information regarding the impedance.

When a load on the fuel cell stack 12 is low, an output electric current required for the fuel cell stack 12 is small. In this case, the electrochemical reaction in the electrodes is not accelerated, and therefore the amount of generated water is small. Thus, only a small amount of moisture is added to the solid polymer electrolyte membrane 32, and therefore proton conduction decreases. As a result, as shown in the interval between time t0 and time t1 in FIG. 3, the impedance of the fuel cell stack 12 (the power generation cells 24) increases. The impedance increases and reaches the upper limit value at time t1.

The controller 22 compares the impedance acquired from the impedance measuring unit 23 with the upper limit value (or the lower limit value) stored beforehand. In the above case, the impedance increases and reaches the upper limit value at time t1.

At this time, the controller 22 performs feedforward control on the BP-opening-degree adjusting valve 88 so as to close the BP-opening-degree adjusting valve 88 to a predetermined opening degree (step S5 in FIG. 2). In the present embodiment, the BP-opening-degree adjusting valve 88 is fully closed. Because the bypass supply passage 86 is closed, the entire amount of compressed air supplied from the air pump 80 flows into the humidifier 84. That is, only moist compressed air is supplied to the cathode electrode 36.

Moreover, the controller 22 performs feedforward control on the air pump 80 and sends an instruction signal for "reducing the rotation speed of the motor". When receiving this signal, the air pump 80 reduces the rotation speed of the motor, and thereby the supply amount of compressed air decreases.

When changing the opening degree of the BP-opening-degree adjusting valve 88, preferably, the operation speed of the BP-opening-degree adjusting valve 88 is appropriately set in order to prevent generation of gas flow noise. To be specific, the operation speed is increased as the opening degree before being operated increases. For example, in both of a case where the opening degree is to be reduced from a valve rotation angle of 50° to 30° and in a case where the opening degree is to be decreased from 30° to 10°, the change in the opening degree is 20°. However, the operation speed in the former case is made greater than that in the latter case.

In this way, by changing the operation speed when changing the opening degree in accordance with the opening degree before being operated (rotation angle), it is possible to reduce gas flow noise that occurs when the BP-opening-degree adjusting valve 88 is opened or closed. Moreover, because the response speed of decreasing the impedance is increased, a negative effect on movement of the fuel cell vehicle is prevented. Therefore, the driver of the vehicle is prevented from experiencing an unpleasant sensation.

As a result of performing the above control, a comparatively small amount of moist compressed air is supplied to the cathode electrode 36. Therefore, moisture is added to the solid polymer electrolyte membrane 32. As a result, the proton conductivity of the solid polymer electrolyte membrane 32 increases, and therefore the impedance decreases as shown in the interval between time t1 and time t2 in FIG. 3. The impedance reaches the upper target value at time t2.

In this state, the controller 22 determines that a sufficient amount of moisture has been added to the solid polymer electrolyte membrane 32. Then, the controller 22 finishes the feedforward control and resumes feedback control. Thus, in the present embodiment, instead of waiting until the impedance decreases from the upper limit value to the lower limit value and finishing the feedforward control when the impedance reaches the lower limit value, the feedforward control is finished while the impedance is decreasing from the upper limit value toward the lower limit value. Therefore, the feedback control, which is performed to keep the solid polymer electrolyte membrane 32 appropriately moist, can be performed early.

The impedance does not become constant immediately after the feedforward control is finished but gradually decreases as shown in the interval between time t2 and time t3 in FIG. 3. When feedback information has not been accumulated, the opening degree of the BP-opening-degree adjusting valve 88 is constant.

The controller 22 sends an instruction signal for "increasing the rotation speed of the motor" to the air pump 80. When receiving this signal, the rotation speed of the motor of the air pump 80 increases and the supply amount of compressed air increases.

Subsequently, the controller 22 continues feedback control so that the impedance becomes substantially constant at the upper target value. That is, in the same way as described above, in the interval between the time t3 and time t4 in FIG. 3, the controller 22 adjusts the opening degree of the BP-opening-degree adjusting valve 88 to adjust the flow rate of dry compressed air and to adjust the humidity of mixed air supplied to the cathode electrode 36. Thus, the solid polymer electrolyte membrane 32 is kept appropriately moist.

After performing such control, when the impedance increases (as in the interval of time t4 to time t5 in FIG. 3) and reaches the upper limit value (at time t5), the aforementioned feedforward control may be performed again.

In particular, when the fuel cell vehicle is idling and the fuel cell stack 12 is performing idling electric power generation for a long time, the output electric current from the fuel cell stack 12 continues to be at the lowest level. Also in this case, the impedance may increase. This is because the electrochemical reaction is not accelerated and the amount of generated water decreases.

In this case, when the temperature of the fuel cell stack 12 reaches a predetermined temperature and the impedance of the fuel cell stack 12 reaches the upper limit value, the controller 22 performs the feedforward control on the BP-opening-degree adjusting valve 88 and the air pump 80. Subsequently, in the same way as described above, the solid polymer electrolyte membrane 32 is kept appropriately moist.

In contrast, when the driver accelerates the fuel cell vehicle, an output electric current required for the fuel cell stack 12 increases. To respond to this, the controller 22 increases the rotation speed of the motor of the air pump 80, and the supply amount of compressed air to the cathode electrode 36 increases. The rate of the electrochemical reaction in the electrodes is accelerated, and, as a result, the amount of generated water increases.

There is a case where the measurement range of an electric current sensor for detecting the output electric current of the fuel cell stack 12 is wide and the impedance measuring unit 23 is not capable of detecting the impedance if the output electric current exceeds a predetermined value, that is, a case where the impedance is unmeasurable (as shown in the interval between time t0' and time t1' in FIG. 4). In this case, the amount of generated water increases and moisture is added to the solid polymer electrolyte membrane 32, and therefore it is not particularly necessary to adjust the opening degree of the BP-opening-degree adjusting valve 88 or to control the rotation speed of the motor of the air pump 80.

If a large amount of water is generated after the output electric current required for the fuel cell stack 12 has decreased, the solid polymer electrolyte membrane 32 becomes excessively moist, and a risk of so-called "flooding" may arise. The controller 22 performs control for avoiding the risk.

That is, if it is assumed that an output electric current required for the fuel cell stack 12 decreases at time t1' in FIG. 4, the controller 22 supplies compressed air to the solid polymer electrolyte membrane 32. To be specific, the controller 22 performs feedforward control on the BP-opening-degree adjusting valve 88 so as to open the BP-opening-degree adjusting valve 88 to a predetermined opening degree (step S6 in FIG. 2). In the present embodiment, the BP-opening-degree adjusting valve 88 is fully opened. Because the bypass supply passage 86 is opened, the entire amount of compressed air supplied from the air pump 80 is distributed to the bypass supply passage 86. That is, mixed air, whose humidity has been reduced, is supplied to the cathode electrode 36.

Moreover, the controller 22 performs feedforward control on the air pump 80 and sends an instruction signal for "increasing the rotation speed of the motor". As a result, the supply amount of compressed air increases. For the same reason described above, preferably, when the operation amount needed to open the BP-opening-degree adjusting valve 88 from a predetermined opening degree to a fully opened state is larger, the operation speed of the BP-opening-degree adjusting valve 88 is increased.

By performing control as describe above, a comparatively large amount of low-humidity compressed air is supplied to the cathode electrode 36. Therefore, the solid polymer electrolyte membrane 32 is likely to become dry. In this case, the impedance increases as shown in the interval between time t1' and time t2' in FIG. 4. The impedance reaches the lower target value at time t2'.

When reaching this state, the controller 22 determines that the solid polymer electrolyte membrane 32 is not excessively moist. That is, the controller 22 finishes the feedforward control and resumes feedback control. Thus, in the present embodiment, instead of waiting until the impedance increases from the lower limit value to the upper limit value and finishing the feedforward control when the impedance reaches the upper limit value, the feedforward control is finished while the impedance is increasing from the lower limit value toward the upper limit value. Therefore, the feedback control, which is performed to keep the solid polymer electrolyte membrane 32 appropriate moist, can be performed early.

Also in this case, the impedance does not become constant immediately after the feedforward control is finished but gradually increases as shown in the interval between time t2' and time t3' in FIG. 4. When feedback information has not been accumulated, the opening degree of the BP-opening-degree adjusting valve 88 is constant.

The controller 22 sends an instruction signal for "reducing the rotation speed of the motor" to the air pump 80. Accordingly, the supply amount of compressed air decreases.

Subsequently, the controller 22 continues feedback control so that the impedance becomes substantially constant at the lower target value. That is, in the same way as described above, in the interval between the time t3' and time t4' in FIG. 4, the controller 22 adjusts the opening degree of the BP-opening-degree adjusting valve 88 to adjust the flow rate of dry compressed air and to adjust the humidity of mixed air supplied to the cathode electrode 36. Thus, the solid polymer electrolyte membrane 32 is kept appropriately moist.

When a large output electric current is required for the fuel cell stack 12 again and the impedance decreases (in the interval between time t4' and time t5' in FIG. 4) and then the required output electric current decreases, the above control may be performed again.

When performing control for moistening the solid polymer electrolyte membrane 32 or performing control for drying the solid polymer electrolyte membrane 32, preferably, as the speed of the fuel cell vehicle increases or the rotation speed of the air pump 80 decreases, the operation speed of the BP-opening-degree adjusting valve 88 is increased. By doing so, a negative effect of gas flow noise due to the operation of the BP-opening-degree adjusting valve 88 can be reduced. This is because, in the former case, the road noise of the fuel cell vehicle is large, and, in the latter case, variation in pressure loss in the bypass supply passage 86 is small.

Moreover, by doing so, the response speed of increase or decrease of the impedance increases. Accordingly, a negative effect on the operation of the fuel cell vehicle is prevented, and the driver is prevented from experiencing an unpleasant sensation.

The present disclosure is not limited to the embodiment described above, which can be modified in various ways within the spirit and scope of the present disclosure.

For example, under conditions in which the impedance of the fuel cell stack 12 is measurable, the feedforward control may be performed on the BP-opening-degree adjusting valve 88 and the air pump 80 when the impedance reaches the lower limit value.

When performing the feedforward control on the BP-opening-degree adjusting valve 88, it is not necessary to fully open or fully close the BP-opening-degree adjusting valve 88, and the opening degree of the BP-opening-degree adjusting valve 88 may be set at an appropriate opening degree.

The upper target value may be equal to the lower target value.

Instead of increasing or decreasing the flow rate of compressed air, control for increasing or decreasing the pressure of the compressed air may be performed. In this case, the pressure is increased when the solid polymer electrolyte membrane 32 is likely to become dry, and the pressure is reduced when the solid polymer electrolyte membrane 32 is likely to become excessively moist.

Alternatively, the flow rate of the coolant may be increased or decreased. In this case, the flow rate is increased when the solid polymer electrolyte membrane 32 is likely to become dry, and the flow rate is reduced when the solid polymer electrolyte membrane is likely to become excessively moist.

Alternatively, the rotation speed of a radiator fan of the fuel cell vehicle may be adjusted. That is, the rotation speed is increased when the solid polymer electrolyte membrane 32 is likely to become dry, and the rotation speed is reduced when the solid polymer electrolyte membrane 32 is likely to become excessively moist.

The use of the fuel cell system 10 is not limited to a vehicle. The fuel cell system 10 may be a stationary system.

The present disclosure provides a method for controlling a fuel cell system including a fuel cell that includes a membrane electrode assembly in which a solid polymer electrolyte membrane is sandwiched between an anode electrode and a cathode electrode and that generates electric power by causing an electrochemical reaction between a fuel gas that is supplied through a fuel gas supply channel to the anode electrode and an oxidant gas that is supplied through an oxidant gas supply channel to the cathode electrode, an oxidant gas supply mechanism that includes a rotational driving unit and that supplies the oxidant gas to the oxidant gas supply channel as the rotational driving unit rotates, a humidifier that moistens the oxidant gas supplied from the oxidant gas supply mechanism, a bypass channel that branches off from the oxidant gas supply channel and that bypasses the humidifier, a bypass channel valve that is disposed in the bypass channel and that closes or opens the bypass channel, and an impedance measuring unit that measures an impedance of the fuel cell. The method includes operating the bypass channel valve by performing feedforward control so as to close the bypass channel to a predetermined opening degree when the impedance measured by the impedance measuring unit has reached a predetermined lower limit value, and operating the bypass channel valve by performing feedforward control so as to open the bypass channel to a predetermined opening degree when the impedance measured by the impedance measuring unit has reached a predetermined upper limit value, so that the impedance is between the lower limit value and the upper limit value.

Because moisture is not added to oxidant gas that flows through the bypass channel, a mixed gas, which includes moist oxidant gas that has flowed through the humidifier and moistened and dry oxidant gas that has flowed through the bypass channel, is supplied to the cathode electrode. Accordingly, by adjusting the opening degree of the bypass channel valve, which is disposed in the bypass channel, by performing feedback control in accordance with the impedance, it is possible to supply a mixed gas whose humidity is appropriately adjusted.

In the present disclosure, when the impedance has reached the upper limit value or the lower limit value, control on the bypass channel valve is switched to feedforward control. That is, when the solid polymer electrolyte membrane is likely to become dry (impedance is likely to increase), the bypass channel valve is closed to a predetermined opening degree to reduce the supply amount of dry oxidant gas. In contrast, when the solid polymer electrolyte membrane is likely to become excessively moist (impedance is likely to decrease), the bypass channel valve is opened to a predetermined opening degree to increase the supply amount of dry oxidant gas.

By adjusting the opening degree of the bypass channel valve as described above, the impedance is returned to an appropriate range in a short time. Therefore, the solid polymer electrolyte membrane is prevented from becoming excessively dry or excessively moist, and therefore it is possible to keep the solid polymer electrolyte membrane appropriately moist. When the feedforward control is performed, the bypass channel valve is, for example, totally closed or totally opened.

Preferably, a supply amount of the oxidant gas is reduced at the same time when the impedance is high and the bypass channel valve is operated so as to be closed. Preferably, the supply amount of the oxidant gas is increased at the same time when the impedance is low and the bypass channel valve is operated so as to be opened. This is because, by doing so, the impedance can be returned to an appropriate range in a comparatively short time. The supply amount of oxidant gas can be reduced or increased by, for example, adjusting the rotation speed of the rotational driving unit of the oxidant gas supply mechanism.

In this case, preferably, an operation speed of the bypass channel valve is reduced as a rotation speed of the rotational driving unit increases. Preferably, the operation speed of the bypass channel valve is increased as the opening degree of the bypass channel valve before being operated increases. In a case where the fuel cell system is mounted in a vehicle, preferably, the operation speed of the bypass channel valve is increased as a speed of the vehicle increases.

In any of these cases, gas flow noise becomes substantially inaudible. In other words, a negative effect of gas flow noise can be reduced. Moreover, the response speed of impedance also increases.

The feedforward control may be finished when the impedance reaches the lower limit value if the impedance is high and may be finished when the impedance reaches the upper limit value when the impedance is low. However, a target value between the lower limit value and the upper limit value may be set, and the feedforward control may be finished when the impedance reaches the target value. By doing so, it is possible to resume feedback control, for keeping the solid polymer electrolyte membrane appropriate moist, in a comparatively short time.

Preferably, the feedforward control on the bypass channel valve is performed when a temperature of the fuel cell reaches a predetermined temperature and the impedance reaches the upper limit value (or the lower limit value) while the fuel cell is performing idling electric power generation. By doing so, the supply amount of dry oxidant gas is adjusted, and therefore it is possible to reliably prevent the solid polymer electrolyte membrane from becoming excessively dry.

With the present disclosure, when the impedance has reached the upper limit value or the lower limit value, control on the bypass channel valve, which is disposed in the bypass channel that bypasses the humidifier, is switched to feedforward control to control the opening degree of the bypass channel valve. That is, when the impedance is likely to increase (when the solid polymer electrolyte membrane is likely to become dry), the bypass channel valve is closed to a predetermined opening degree to reduce the supply amount of dry oxidant gas. When the impedance is likely to decrease (when the solid polymer electrolyte membrane is likely to become excessively moist), the bypass channel valve is opened to a predetermined opening degree to increase the supply amount of dry oxidant gas.

Thus, the impedance is returned to an appropriate range in a short time. As a result, the solid polymer electrolyte membrane is prevented from becoming excessively dry or excessively moist, and it is possible to keep the solid polymer electrolyte membrane appropriately moist. Accordingly, the proton conductivity of the solid polymer electrolyte membrane is maintained and the fuel cell has good power generation characteristics.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling a fuel cell system, the fuel cell system including
    a fuel cell that includes a membrane electrode assembly in which a solid polymer electrolyte membrane is sandwiched between an anode electrode and a cathode electrode and that generates electric power by causing an electrochemical reaction between a fuel gas that is supplied through a fuel gas supply channel to the anode electrode and an oxidant gas that is supplied through an oxidant gas supply channel to the cathode electrode,
    an oxidant gas supply mechanism that includes a rotational driving unit and that supplies the oxidant gas to the oxidant gas supply channel as the rotational driving unit rotates,
    a humidifier that moistens the oxidant gas supplied from the oxidant gas supply mechanism,
    a bypass channel that branches off from the oxidant gas supply channel and that bypasses the humidifier,
    a bypass channel valve that is disposed in the bypass channel and that closes or opens the bypass channel, and
    a controller that is configured to measure an impedance of the fuel cell, the method comprising:
    operating the bypass channel valve by performing feedforward control so as to close the bypass channel to a predetermined opening degree based on a determination that the impedance measured by the controller has reached, or is lower than, a predetermined lower limit value, and operating the bypass channel valve by performing feedforward control so as to open the bypass channel to a predetermined opening degree based on a determination that the impedance measured by the controller has reached a predetermined upper limit value, so that the impedance is between the lower limit value and the upper limit value.

2. The method according to claim 1,
wherein a supply amount of the oxidant gas is reduced when the bypass channel valve is operated so as to be closed and the supply amount of oxidant gas is increased when the bypass channel valve is operated so as be opened.

3. The method according to claim 2,
wherein an operation speed of the bypass channel valve is reduced as a rotation speed of the rotational driving unit increases.

4. The method according to claim 1,
wherein the operation speed of the bypass channel valve is increased as the opening degree of the bypass channel valve before being operated increases.

5. The method according to claim 1,
wherein the fuel cell system is mounted in a vehicle, and the operation speed of the bypass channel valve is increased as a speed of the vehicle increases.

6. The method according to claim 1,
wherein the feedforward control on the bypass channel valve is finished when the impedance reaches a predetermined target value between the lower limit value and the upper limit value.

7. The method according to claim 1,
wherein the feedforward control on the bypass channel valve is performed when a temperature of the fuel cell reaches a predetermined temperature and the impedance reaches the lower limit value or the upper limit value while the fuel cell is performing idling electric power generation.

8. A method for controlling a fuel cell system, comprising:
    supplying an oxidant gas, via an oxidant gas supply channel, to a cathode electrode of a fuel cell that includes a membrane electrode assembly including a solid polymer electrolyte membrane which is sandwiched between an anode electrode and the cathode electrode;
    supplying a fuel gas to the anode electrode of the fuel cell to generate electric power via an electrochemical reaction between the fuel gas and the oxidant gas;
    moistening the oxidant gas to be supplied to the cathode electrode with a humidifier provided in the oxidant gas supply channel;
    measuring an impedance of the fuel cell;
    decreasing an opening degree of a bypass channel valve via a feedforward control to a first opening degree based on a determination that the impedance has reached, or is lower than, a lower limit value, the bypass channel valve being provided in a bypass channel that bypasses the humidifier; and
    increasing the opening degree of the bypass channel valve via the feedforward control to a second opening degree based on a determination that the impedance has reached an upper limit value, the first opening degree being smaller than the second opening degree.

9. The method according to claim 8,
wherein a pump includes a rotational driving unit to supply the oxidant gas to the fuel cell.

10. The method according to claim 9,
wherein a supply amount of the oxidant gas is reduced when the bypass channel valve is operated so as to be closed and the supply amount of oxidant gas is increased when the bypass channel valve is operated so as be opened.

11. The method according to claim 10,
wherein an operation speed of the bypass channel valve is reduced as a rotation speed of the rotational driving unit increases.

12. The method according to claim 8,
wherein the operation speed of the bypass channel valve is increased as the opening degree of the bypass channel valve before being operated increases.

13. The method according to claim 8,
wherein the fuel cell system is mounted in a vehicle, and the operation speed of the bypass channel valve is increased as a speed of the vehicle increases.

14. The method according to claim 8,
wherein control of adjusting the opening degree is finished when the impedance reaches a predetermined target value.

15. The method according to claim 8,
wherein control of adjusting the opening degree is performed when a temperature of the fuel cell reaches a predetermined temperature and the impedance reaches a predetermined target value while the fuel cell is performing idling electric power generation.

16. The method according to claim 8,
wherein the opening degree of the bypass channel valve is decreased and increased so that the impedance of the fuel cell is controlled to be between the lower limit value and the upper limit value.

17. The method according to claim 1,
wherein the controller is configured to store the predetermined lower limit value and the predetermined upper limit value.

18. The method according to claim 1,
wherein the feedforward control on the bypass channel valve is finished and feedback control is performed based on a determination that the impedance reaches a value between the lower limit value and the upper limit value.

19. The method according to claim 8,
wherein the feedforward control on the bypass channel valve is finished and feedback control is performed based on a determination that the impedance reaches a value between the lower limit value and the upper limit value.

* * * * *